United States Patent [19]

Kajitori

[11] Patent Number: 5,422,454
[45] Date of Patent: Jun. 6, 1995

[54] DEVICE FOR SETTING WIRE TENSION FOR A WIRE-CUT ELECTRICAL DISCHARGE MACHINE

[75] Inventor: Toyotada Kajitori, Yamanashi, Japan

[73] Assignee: Fanuc, Ltd., Yamanishi et al., Japan

[21] Appl. No.: 190,175

[22] PCT Filed: Jun. 25, 1993

[86] PCT No.: PCT/JP93/00669
§ 371 Date: Feb. 23, 1994
§ 102(e) Date: Feb. 23, 1994

[87] PCT Pub. No.: WO94/00266
PCT Pub. Date: Jan. 6, 1994

[30] Foreign Application Priority Data

Jun. 26, 1992 [JP] Japan .................. 4-169481

[51] Int. Cl.[6] .................. B23H 1/00; B23H 7/10
[52] U.S. Cl. .................. 219/69.12; 242/419.9
[58] Field of Search .................. 219/69.12; 242/419.9

[56] References Cited

U.S. PATENT DOCUMENTS

| | | | |
|---|---|---|---|
| 4,748,310 | 5/1988 | Aso et al. | 219/69.12 |
| 4,978,828 | 12/1990 | Umetsu et al. | 219/69.12 |
| 5,023,420 | 6/1991 | Aso et al. | 219/69.12 |
| 5,130,508 | 7/1992 | Umetsu et al. | 219/69.12 |
| 5,142,116 | 8/1992 | Yokomichi et al. | 219/69.12 |
| 5,268,551 | 12/1993 | Kawanabe et al. | 219/69.12 |

FOREIGN PATENT DOCUMENTS

| | | | |
|---|---|---|---|
| 62-236627 | 10/1987 | Japan | 219/69.12 |
| 63-214554 | 7/1988 | Japan . | |
| 63-300823 | 12/1988 | Japan . | |
| 64-11731 | 1/1989 | Japan . | |
| 64-64724 | 3/1989 | Japan . | |
| 1-121129 | 5/1989 | Japan . | |
| 1-146620 | 6/1989 | Japan | 219/69.12 |
| 2-100829 | 4/1990 | Japan | 219/69.12 |
| 4-250924 | 9/1992 | Japan | 219/69.12 |

*Primary Examiner*—Geoffrey S. Evans
*Attorney, Agent, or Firm*—Nikaido, Marmelstein, Murray & Oram

[57] ABSTRACT

A device for setting the tension of an electrode wire of a wire-cut electrical discharge machine comprises a powder clutch (60) and DC motor (48) mounted on two parallel shafts (54, 66) respectively. The rotation of the DC motor (48) is transmitted by an one-way rotation transmitting means (56) to the shaft (66) on which the powder clutch (60) is mounted while the rotation of the shaft (66) for the powder clutch (60) is not transmitted to to the DC motor(48). During the normal operation of the electrical discharge machine, the device for setting tension applies an appropriate tension to the electrode wire (2). When the electrode is being prepared for operation, the one-way rotation transmitting means (56) intercepts the resistance of the device for setting wire tension, which may otherwise be transmitted to the electrode wire (2).

6 Claims, 3 Drawing Sheets

DEVICE FOR SETTING WIRE TENSION FOR A WIRE-CUT ELECTRICAL DISCHARGE MACHINE

TECHNICAL FIELD

The present invention relates to a wire-cut electrical discharge machine, in particular, to a device for setting the tension of an electrode wire (referred to as a wire tension setting device) during a normal machining operation. The wire tension setting device is integral with a wire feeding device which provides the electrode wire for the electrical discharge machine during operation.

BACKGROUND ART

An electrical discharge machine with an electrode in the form of an electrically conductive wire, referred to as an electrode wire, electrically machines a workpiece into the desired shape by using an electrical discharge generated between the electrode wire and the workpiece by applying a discharge voltage therebetween. The electrode wire is drawn from a wire bobbin by a wire conveying device, and moves through upper and lower wire guides provided in a machining region.

A wire tension setting device is provided between the wire bobbin and the wire conveying device in order to apply a wire tension to the moving electrode wire.

Referring FIG. 3, an example of the wire tension setting device of the prior art is illustrated.

The wire tension setting device of FIG. 3 comprises a brake roller 6 which applies a braking torque to an electrode wire 2. The brake roller 6 is connected to a output shaft 75 of a powder clutch 74, and is rotatable about the output shaft 75. The electrode wire 2 is around the brake roller 6, and moves in a predetermined direction. An input shaft 82 of the powder clutch 74 is connected to an output shaft 80 of a speed reducer 79 through a coupling 76. An input shaft (not shown) of the speed reducer 79 is connected to an output shaft (not shown) of a DC motor 78 which is used for feeding the electrode wire 2.

The powder clutch 74 is a commercially available means for transmitting a torque, which comprises magnetic powder and a exciting coil. When the exciting coil is energized, it generates magnetic field. In this magnetic field, the magnetic powder connects the input shaft 82 to the output shaft 75 so that torque is transmitted from the input shaft 82 to the output shaft 75. The magnetic powder allows slip between the input shaft 82 and the output shaft 75. The torque transmitted from the input shaft 82 to the output shaft 75 is controlled by the current to the exciting coil which controls the slip between the two shafts. During the normal machining operation of the electrical discharge machine, the braking torque on the brake roller 6 produces the tension in the electrode wire 2.

When the electrical discharge machine begins to operate or when the electrode wire 2 is broken, an electrode wire 2 must be installed, that is, a new portion of the electrode wire 2 must be drawn from the wire bobbin (not shown) and be engaged with the wire conveying device provided in the lower wire guide or within a column. This process is referred to as "wire connection".

The wire tension setting device is also used during wire connection. The DC motor 78 is energized after the new portion of the electrode wire 2 is drawn from the wire bobbin and wound around the brake roller 6.

The rotation of the DC motor 78 is transmitted to the input shaft 82 of the powder clutch 74 through the coupling 76. When current is supplied to the powder clutch 74, the input shaft 84 is connected to the output shaft 75. Thus, the rotation of the DC motor is transmitted to the brake roller through the output shaft 75. The rotation of the brake roller 6 feeds the electrode wire 2 toward the wire conveying device. The above described wire connection is referred as "automatic wire connection", since it is automatically performed as one of the functions of the electrical discharge machine.

Once wire connection is completed, the current to the DC motor 7 is cut off. Since the electrode wire 2 is wound around the brake roller 6, the brake roller 6 continues rotating due to the friction between the surface of the brake roller 6 and the moving electrode wire 2. From FIG. 3, it may be understood that the powder clutch 74 applies the braking torque to the brake roller 6 with slipping between the input shaft 82 and the output shaft 75 when the DC motor 78 is de-energized because the input shaft 82 of the powder clutch 74 is prevented from rotating by the speed reducer 79. The current supplied to the powder clutch 74 is controlled so as to generate the proper braking torque. The braking torque applies tension to the electrode wire 2.

It may be understood from the above description that the wire tension setting device shown in FIG. 3 comprises the powder clutch 74 and the DC motor 78 connected in line relation to each other so as to perform both the wire feeding function and the wire tension setting function.

However, the wire tension setting device of the prior art shown in FIG. 3 has a disadvantage in that automatic wire connection cannot be carried out satisfactorily. When the electrode wire 2 is fed by the DC motor 78 for automatic wire connection, the input shaft 82 of the powder clutch 74 must be connected to the output shaft 75 in order to transmit the rotation of the DC motor 78 to the brake roller 6. The braking torque acts as a resistance to a force generated by the wire conveying device for drawing the electrode wire 2. This interferes with automatic wire connection.

In order to overcome this problem, some wire-cut electrical discharge machines comprise a wire feeder with a DC motor, and an independent wire tension setting device with a powder clutch. This type of wire-cut electrical discharge machine, however, has a disadvantage in that the machine requires two independent devices, that is, the wire feeding device and the wire tension setting device, whereby the cost is increased.

Furthermore, the wire tension setting device disclosed in the Japanese Unexamined Patent Publication Kokai) No. 63-300823 comprises a high torque electro-magnetic brake 15 and a low torque electro-magnetic brake 13 so as to make it possible to provide a wide range of wire tensions (see FIG. 1 in the above publication). However, the publication does not disclose the relationship between the electric motor and the electro-magnetic brake. Furthermore, the low torque electro-magnetic brake is a means for applying the proper torque to a thin electrode wire, and is not for connecting the electrode wire effectively.

Futhermore, some wire conveying devices have been improved so as to increase the force for drawing the electrode wire while using the type of the wire tension setting device shown in FIG. 3.

For example, a wire conveying device comprises an engaging roller, which is rotated by machining liquid directed onto the engaging roller in the form of jet, for drawing the electrode wire into the lower wire guide. Another wire conveying device is formed so as to direct the machining liquid in the form of jet into an arm member of the lower wire guide, and the electrode wire is drawn into the lower wire guide by the flow of the machining liquid. However, the above two devices do not increase the drawing force.

It is conceivable that in order to increase the drawing force sufficiently, a wire conveying device may comprise an electric motor and an engaging roller connected to the motor. However, in the recent mainstream of electrical discharge machine design, the workpiece and at least a portion of the wire conveying device are immersed in the machining liquid. Therefore, it is difficult to use a conventional electrical driving means in the wire conveying device in the lower wire guide.

For that reason, a wire-cut electrical discharge machine comprises an electric motor within the column thereof, and the electric motor rotates an engaging roller through a belt therebetween. This type of wire conveying device can generate a sufficiently large force compared with the braking torque by the powder clutch 74. However, in this manner, the belt must be led into a sump for machining liquid. This requires a complex sealing arrangement for the machining liquid.

Disclosure of the Invention

Therefore, the object of the present invention is to provide a wire tension setting device which has both a wire feeding function and a wire tension setting function, and in which the resistance of the wire tension setting device is reduced when the wire conveying device draws the electrode wire during automatic wire connection.

In order to achieve the above object, there provided a device for setting the tension of an electrode wire of a wire-cut electrical discharge machine, the electrode wire being moved through the machining region by the device, comprising:

a brake roller engaging with the electrode wire ahead of the machining region, and mounted on a first shaft;

a braking means for applying braking torque to the brake roller, and axially aligned with the first shaft;

a one-way rotation transmitting means mounted on a second shaft parallel to the first shaft, the one-way rotation transmitting means transmitting a predetermined directional rotation of the second shaft to the first shaft;

a rotational drive means axially aligned with the second shaft, the first shaft being rotated by the rotational drive means through the one-way rotation transmitting means in a wire feeding direction, whereby a new portion of the electrode wire is fed during preparation for operation; and the device for setting the tension moving the electrode wire through the brake roller such that during the preparation of the electrode wire for operation, the electrode wire is fed by the rotational drive means or during normal operation, the electrode wire receives a tension from the braking means.

In a preferred embodiment, the braking means may be an electro-magnetically operated means such as a powder clutch.

In another preferred embodiment, the one-way rotation transmitting means may comprise an one-way clutch which is connected to a pulley on the first shaft by a belt.

The rotational drive means can comprise a DC motor.

BRIEF DESCRIPTION OF THE DRAWINGS

The above and the other object of the invention will be apparent from claims and the following description taken in connection with the accompanying drawing, in which:

BEST MODE FOR CARRYING OUT THE INVENTION

Figure 1:
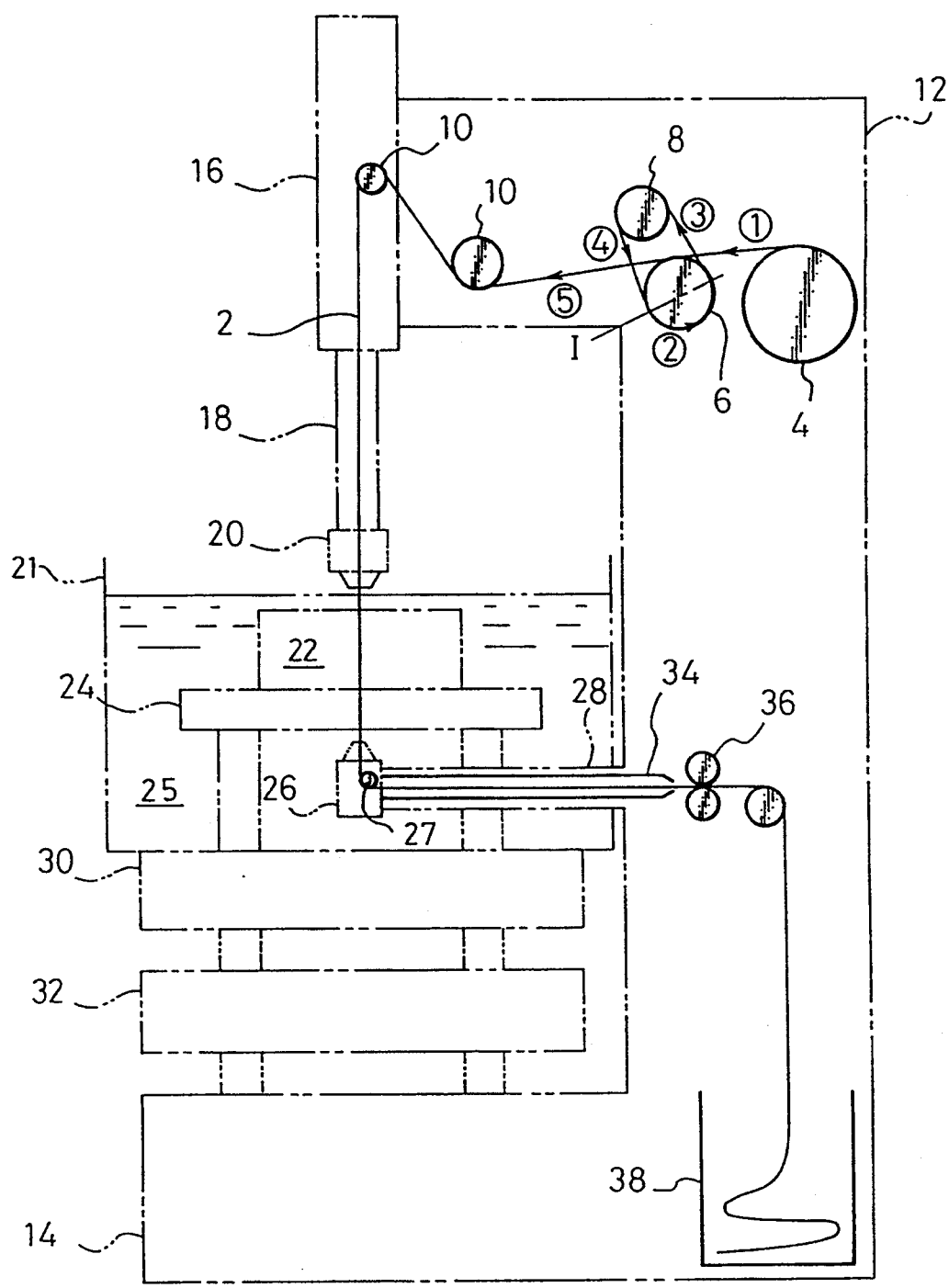
FIG. 1 is a schematic perspective diagram of a wire-cut electrical discharge machine.

Referring FIG. 1, a wire-cut electrical discharge machine comprises an electrode wire 2 moving through an upper wire guide 20 and a lower wire guide 26 under tension, and a workpiece carriage 24 which is movable along the desired machining path by means of an X-Y table 30 and 32.

A workpiece 22 mounted on the workpiece carriage 24 is fed along a predetermined machining path by the X-Y table 30 and 32 so as to be machined into a desired shape.

In order to stabilize the electrical discharge spark between the electrode wire 2 and the workpiece 22 and to cool the machining region, machining liquid 25, such as deionized water or kerosene, is used. In some electrical discharge machines, the machining liquid is directed from a nozzle provided at a position near the upper and lower guides 20 and 26 toward the machining region. However, a recent type of wire-cut electrical discharge machine comprises a sump 21 on a top surface of the X-Y table 30 and 32 in which the machining liquid 25 is contained. The workpiece 22, the workpiece carriage 24, the lower wire guide 26 and a supporting arm 28 for the lower wire guide are immersed in the machining liquid 25 with in the sump 21.

The electrode wire 2 is drawn from a wire bobbin 4 and extended between a brake roller 6 and an additional roller 8 as shown by arrows ①-⑤. The electrode wire 2 is fed to the upper and lower wire guides 20 and 26 through a plurality of guide rollers 10 and drawn into the supporting arm 28 for the lower guide 26 under tension by a wire conveying device 27, 34 and 36 after passing through the upper and lower wire guides 20 and 26. The electrode wire 2 which has completed machining process is collected within a container 38 provided in a bed 14 for collecting the used electrode wire.

The wire conveying device shown in FIG. 1, for example, comprises an engaging roller 27, a wire conduit 34 and wire drawing rollers 36. The engaging roller 27 is rotatable by directing the machining liquid 25 contained within the sump 21 in the form of jet. The wire drawing rollers 36 are driven by an electric motor (not shown).

Figure 2:
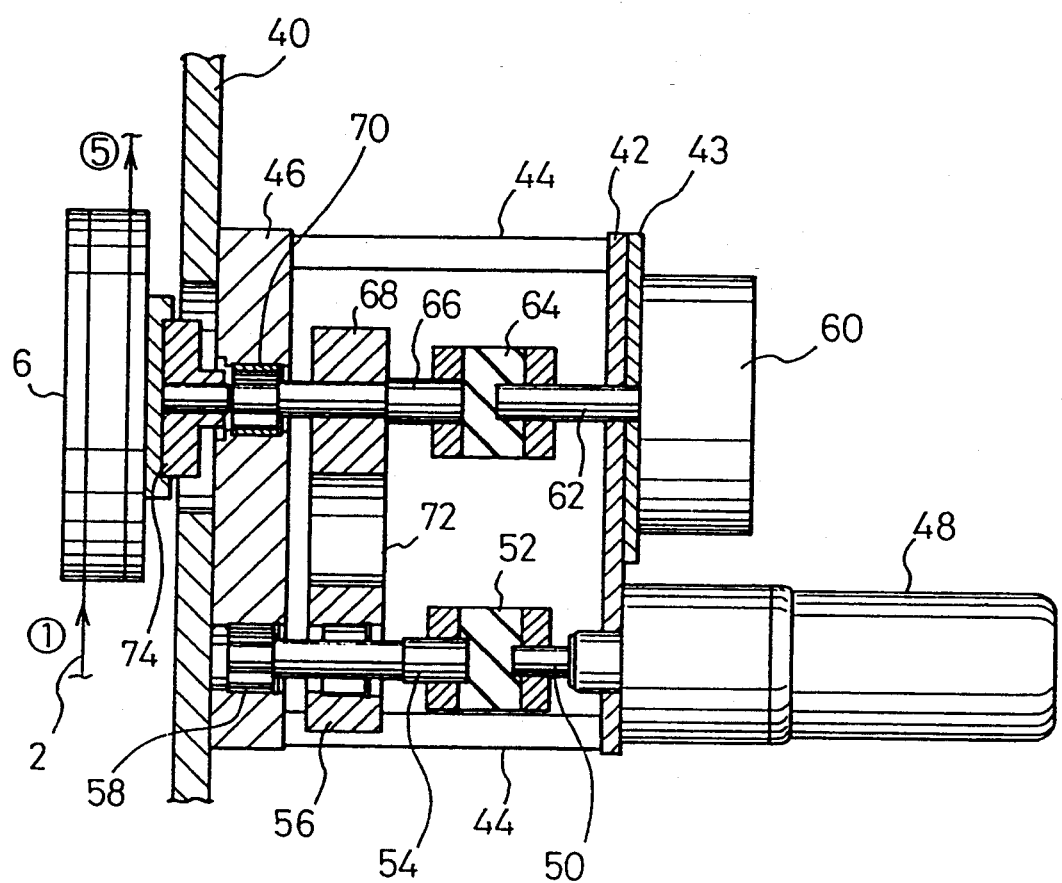
FIG. 2 is a schematic sectional view of the wire tension setting device in accordance with the invention.
Figure 3:
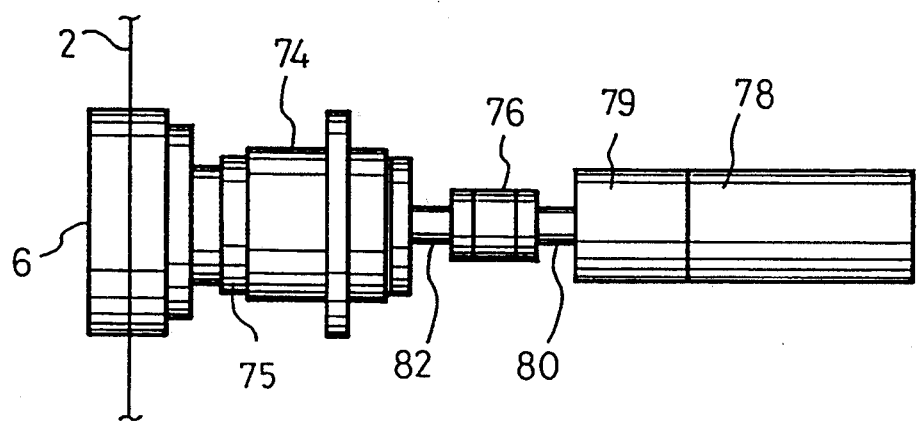
FIG. 3 is a schematic sectional view of the wire tension setting device of the prior art.

Referring to FIG. 2 which is a sectional view along a line I in FIG. 1, a wire tension setting device in accordance with the invention comprises a housing composed of side walls 42 and 46, and a plurality of supports 44. The housing is attached onto a side wall 40 of the electrical discharge machine. The electrode wire 2 is drawn from the wire bobbin 4, wound around the brake roller 6 along the arrows ① and ⑤, and extended toward the guide rollers 10. In the preferred embodiment of the invention shown, the electrode wire 2 is wound around the brake roller 1 once. However, it is apparent that the electrode wire 2 can be wound more than two times around the brake roller 6.

The brake roller 6 is mounted on a first shaft 66 through a flange 74. The first shaft 66 is rotatably mounted in a through hole formed on the side wall 46 by a known bearing means 70 such as roller bearing. The end opposite to the end of the first shaft 66 to which the brake roller 6 attached is connected to a rotor shaft 62 of a powder brake 60 by a coupling 64. The powder brake 60 is mounted onto the side wall 42 by a flange 43.

The powder brake 60 is a well known rotation controlling means which is formed as the powder clutch 74 described above. The powder brake 60 comprises magnetic powder and a exciting coil within a housing. When the coil is energized, a magnetic field is generated. The magnetic field affects to the magnetic powder which connects the rotor shaft 62 to the housing where by the rotor shaft 62 is braked. The magnetic powder also allows slip between the shaft 62 and the housing. The slip is controlled by the current to the exciting coil, and thus the brake torque of the shaft 62 is controlled.

The first shaft 66 has a pulley 68 positioned between the bearing means 70 and the coupling 64. The pulley 68 is fixed on the first shaft 66 in a well known manner such as tight fit or a key so that the pulley rotates together with the first shaft.

A one-way clutch 56 is provided on a second shaft 54. The one-way clutch 56 is a well known means for transmitting rotation in one direction. If a shaft provided with the one-way clutch is rotatable both directions, the clutch transmits the rotation of the shaft in one of the two directions. Though various types of the one-way clutch are known, in order to use in the wire tension setting device of the invention, it is preferable to select a type having characteristics including idle torque as small as possible and radial run out of the shaft as small as possible at the idle running.

A belt 72 is provided between the pulley 68 and the one-way clutch 56. The belt 72 may be another means such as chain which can transmit the rotation of the first shaft 66 to the second shaft 54. In this case, the pulley 68 is replaced with a sprocket.

One end of the second shaft 54 is mounted in a through hole provided on the side wall 46 by a bearing means 58 such as a roller bearing. By a coupling 52, the other end of the second shaft 54 is connected to a shaft 50 of a rotation drive means 48 for feeding the electrode wire 2 during automatic wire connection of the electrode wire 2. The rotation drive means 48 includes a DC motor and a speed reducer, however, it is possible to use another type of a well known electric motor.

The operation of the wire tension setting device of the invention is described with referring to FIG. 1 and 2.

During the normal operation of the wire-cut electrical discharge machine, the electrode wire 2 is directed through the machining region and is extending between the brake roller 6 and the additional roller 8 along the arrows ①-⑤ as shown FIG. 1. At this time, the brake roller 6 is rotated by the engagement with the electrode wire 2. The rotation of the brake roller 6 is not transmitted to the DC motor 48 because of the idle running of the one-way clutch. The powder brake 60 is energized so as to generate the braking torque. Controlling the current results in the powder clutch 60 applying a appropriate tension to the electrode wire 2 with slipping between the housing (not shown) and the rotor shaft 62.

When the electrical discharge machine starts its operation or when the electrode wire 2 is cut, automatic wire connection is carried out as follows.

The electrode wire 2 is drawn from the bobbin 4 and wound around the brake roller 6. Then, the DC motor 48 rotates the brake roller 6 through the one-way clutch 56, belt 72, and the pulley 68. This results in feeding of the electrode wire 2 which is drawn from the wire bobbin 4 and wound around the brake roller 6. When the electrode wire 2 reaches to the lower wire guide 26 of the electrical discharge machine, the electrode wire 2 engages with the engaging roller 27 of the wire conveying device. The engaging roller 27 draws the electrode wire 2 at a speed higher than the feeding speed of the brake roller 6. Thus, the electrode wire 2 is led through the lower wire guide 26 and the supporting arm 28 there of by the wire conveying device 27, 34 and 36. At this time, the resistance of the wire tension setting device to the electrode wire 2 is intercepted by the idle running of the one-way clutch 56. During this, the powder clutch 60 does not apply the brake torque to the electrode wire 2 since the powder brake 60 is not energized.

It may be understood from the above description that since the one-way clutch 56 intercepts the resistance of the wire tension setting device, the wire conveying device can draw the electrode wire so as to carry out automatic wire connection sufficiently while the wire conveying device is a type with an engaging roller which is rotated by the machining liquid in the form of jet and has small drawing force for the electrode wire.

Furthermore, the wire tension setting device in accordance with the invention is integrally formed with a wire feeding device. This results in reducing the dimension of the device and the manufacturing cost.

It may be understood by those skilled in the art that the above description is only one preferred embodiment of the invention and that various changes and improvements can be made without departing from the spirit and scope of the invention.

I claim:

1. A device for setting a tension of an electrode wire in a wire-cut electrical discharge machine and moving said electrode wire through a machining region, comprising:

a brake roller engaging with said electrode wire in advance of said machining region, and mounted on a first shaft;

a braking means for applying braking torque to said brake roller, and axially aligned with said first shaft;

a one-way rotation transmitting means mounted on a second shaft parallel to said first shaft, said one-way rotation transmitting means transmitting a predetermined directional rotation of said second shaft to said first shaft;

a rotational drive means axially aligned with said second shaft, said first shaft being rotated by said rotational drive means through said one-way rotation transmitting means in a wire feeding direction, whereby a new portion of said electrode wire is fed during preparation for operation; and said device for setting the tension moving said electrode wire through said brake roller such that during said preparation of said electrode wire for operation, said electrode wire is fed by said rotational drive means, but that during normal operation, said electrode wire receives a tension from said braking means.

2. A device for setting the tension according to claim 1, wherein said braking means is operated electro-magnetically.

3. A device for setting the tension according to claim 2, wherein said braking means comprises a powder clutch.

4. A device for setting the tension according to claim 1, wherein said one-way rotation transmitting means comprises a one-way clutch.

5. A device for setting the tension according to claim 4, wherein said first shaft has a pulley rotatable with said first shaft, and said pulley is connected to said second shaft by a belt.

6. A device for setting the tension according to claim 1, wherein said rotational drive means comprises a DC motor.

* * * * *

UNITED STATES PATENT AND TRADEMARK OFFICE
CERTIFICATE OF CORRECTION

PATENT NO. : 5,422,454
DATED : June 6, 1995
INVENTOR(S) : Toyotada KAJITORI

It is certified that error appears in the above-identified patent and that said Letters Patent is hereby corrected as shown below:

On the title page, Item [86], change " PCT/JP93/00669" to -- PCT/JP93/00869 --.

Signed and Sealed this

Nineteenth Day of September, 1995

Attest:

BRUCE LEHMAN

*Attesting Officer*     *Commissioner of Patents and Trademarks*